United States Patent
Valeri

(10) Patent No.: US 8,916,622 B2
(45) Date of Patent: Dec. 23, 2014

(54) HEAT-CURABLE EPOXY FUNCTIONAL COMPOSITION AND TRANSPARENT HEAT-CURED CAUSTIC-RESISTANT HARD-COATINGS PREPARED THEREFROM

(75) Inventor: Robert Valeri, St. Petersburg, FL (US)

(73) Assignee: Essilor Internatonal (Compagnie Générale d'Optique), Paris (FR)

( * ) Notice: Subject to any disclaimer, the term of this patent is extended or adjusted under 35 U.S.C. 154(b) by 73 days.

(21) Appl. No.: 13/515,365

(22) PCT Filed: Dec. 17, 2009

(86) PCT No.: PCT/US2009/068446
§ 371 (c)(1),
(2), (4) Date: Aug. 24, 2012

(87) PCT Pub. No.: WO2011/075128
PCT Pub. Date: Jun. 23, 2011

(65) Prior Publication Data
US 2012/0327364 A1 Dec. 27, 2012

(51) Int. Cl.
| | | |
|---|---|---|
| *C09D 163/00* | (2006.01) | |
| *C08L 63/00* | (2006.01) | |
| *C08G 59/38* | (2006.01) | |
| *C09D 183/08* | (2006.01) | |
| *B05D 5/06* | (2006.01) | |
| *G02C 7/02* | (2006.01) | |
| *G02C 7/10* | (2006.01) | |
| *G02B 1/10* | (2006.01) | |

(52) U.S. Cl.
CPC .............. *C08G 59/38* (2013.01); *C09D 163/00* (2013.01); *G02B 1/105* (2013.01); *C08L 63/00* (2013.01)
USPC ................... 523/106; 351/159.57; 427/163.2; 523/435; 523/456

(58) Field of Classification Search
None
See application file for complete search history.

(56) References Cited

U.S. PATENT DOCUMENTS

| | | | |
|---|---|---|---|
| 4,319,974 A * | 3/1982 | Crivello | 522/31 |
| 5,548,026 A * | 8/1996 | Jorissen et al. | 525/113 |
| 6,187,444 B1 | 2/2001 | Bowles, III et al. | |
| 6,268,055 B1 | 7/2001 | Walters et al. | |
| 6,492,092 B1 * | 12/2002 | Foster et al. | 430/271.1 |
| 6,716,568 B1 * | 4/2004 | Minsek et al. | 430/280.1 |
| 6,750,266 B2 * | 6/2004 | Bentsen et al. | 522/2 |
| 6,984,262 B2 * | 1/2006 | King et al. | 106/287.22 |
| 7,571,979 B2 * | 8/2009 | Patil et al. | 347/20 |
| 8,394,575 B2 * | 3/2013 | Wu et al. | 430/280.1 |
| 2004/0142105 A1 | 7/2004 | Sakurada et al. | |
| 2005/0014004 A1 * | 1/2005 | King et al. | 428/413 |
| 2007/0076059 A1 * | 4/2007 | Patil et al. | 347/65 |
| 2008/0311404 A1 * | 12/2008 | Diggins | 428/413 |
| 2008/0317950 A1 * | 12/2008 | Berzon et al. | 427/162 |
| 2009/0155729 A1 * | 6/2009 | Weaver et al. | 430/320 |
| 2012/0082933 A1 * | 4/2012 | Wu et al. | 430/280.1 |

FOREIGN PATENT DOCUMENTS

| | | |
|---|---|---|
| WO | 95/12646 | 5/1995 |
| WO | 03/058300 | 7/2003 |
| WO | 2007/070976 | 6/2007 |
| WO | WO 2007070976 A1 * | 6/2007 |

* cited by examiner

*Primary Examiner* — James J Seidleck
*Assistant Examiner* — Peter A Salamon
(74) *Attorney, Agent, or Firm* — Gardere Wynne Sewell LLP

(57) ABSTRACT

A heat-curable composition comprises—from 25 to 65% by weight of a mixture of epoxy-functional monomers, said mixture consisting of at least one polyfunctional epoxy monomer selected from monomers comprising from 4 to 8 glycidyl groups and/or cycloaliphatic epoxy groups, and at least one bi- or tri-functional epoxy monomer selected from monomers comprising two or three glycidyl groups and/or cycloaliphatic epoxy groups, —from 25 to 70% by weight of at least one organic solvent selected from glycol monoethers, —from 2.5 to 5% by weight, relative to the total weight of epoxyfunctional monomers (a) and (b), of at least one blocked strong acid catalyst, said heat-curable composition not containing any non-epoxyfunctional monomers, in particular not containing any acrylic, methacrylic or silane monomers.

9 Claims, No Drawings

HEAT-CURABLE EPOXY FUNCTIONAL COMPOSITION AND TRANSPARENT HEAT-CURED CAUSTIC-RESISTANT HARD-COATINGS PREPARED THEREFROM

CROSS REFERENCE TO RELATED APPLICATIONS

This application is the national stage of international application no. PCT/US2009/068446, filed Dec. 17, 2009, the contents of which are hereby incorporated by reference in their entirety.

The present invention relates to heat-curable epoxy functional compositions, to transparent caustic-resistant epoxy-based hard-coatings obtained therefrom, and to photochromic articles, in particular ophthalmic lenses, containing such a hard-coating as a protective coating of the underlying photochromic layer.

Photochromic plastic articles can be prepared by incorporating the photochromic material into the plastic substrate by imbibition techniques, or by applying organic photochromic coatings to the surface of such a plastic substrate (see for example U.S. Pat. No. 6,187,444 describing the application of a photochromic polyurethane coating to a plastic substrate). It has further been proposed to apply a hard-coating onto the exposed surface of the photochromic coating to protect it against scratches or similar cosmetic defects resulting from physical handling of the article (see for example U.S. Pat. No. 6,268,055).

In certain circumstances involving ophthalmic lenses having a photochromic polymeric coating and an overlaying hard-coating it was noticed during wearer tests that, over time, some wearers developed defects on their lenses that resembled small worms or blisters in the hard-coating. What was happening was that when a lens was scratched or nicked and moisture or alcohol based cleaning solutions were subsequently allowed to get to the photochromic polymer layer under the hard-coating, it would swell in the area of the scratch or nick and result in cosmetic defects looking respectively like worms or blisters. An additional protective coating on the hard-coating or a hard-coating that, by itself, is thick enough and tough enough to prevent scratches or nicks to reach the polymeric photochromic layer is expected to overcome this problem.

In addition, it is not uncommon to find that an abrasion-resistant or antireflective coating that is applied to a photochromic article, such as a lens, fails to pass product requirements or does not meet commercially acceptable cosmetic standards for ophthalmic lenses. When this occurs, it is economically desirable to remove the defective coating for example by a chemical treatment using heated caustic solutions (aqueous or alcoholic 5-10% NaOH solutions at 50-70° C.), and thereafter to apply a new coating. In the process of chemically removing the defective coating, the underlying coatings should, of course, not be damaged.

WO 03/058300 provides acrylate-based UV-curable compositions forming caustic-resistant transparent hard-coatings that attenuate or even resolve the above mentioned problems. However, such systems are not compatible with large dip coating equipment and conditions where large amounts of curable coating compositions are stored for several weeks. As a matter of fact it is stated in WO 03/058300 that the acrylate based compositions could alternatively be thermally cured. This, however, would require the use of azo type initiators or peroxide initiators which are far more reactive and less stable and safe to use in large scale production dip coating equipment. Furthermore, the scratch resistance of the acrylate based cured compositions described in WO 03/058300 is not totally satisfying and is significantly poorer than the one of the epoxy-based cured compositions of the present invention.

The Applicant has developed alternative curable compositions for protecting photochromic polymer layers of optical articles, said compositions being heat-curable non(meth)acrylate and non silane-based compositions which can be stored for several weeks and can be conveniently applied by dip coating or spin coating. Said compositions, upon curing, lead to transparent clear caustic-resistant hard-coatings which provide excellent protection for underlying photochromic layer and good compatibility and adhesion for additional polysiloxane abrasion-resistant and scratch resistant layers or latex primer layers coated thereon.

The heat curable compositions of the present invention are based exclusively on bi- or tri- and poly-functional epoxy monomers, and are essentially free of any other type of monomers. The Applicant has discovered that, in order to obtain hard coatings that both exhibit excellent caustic resistance and efficiently prevent the formation of "worm"-like and "blister"-like defects in the protective coating, it was important to carefully select the amounts of bi- and tri-functional monomers, on the one hand, and polyfunctional monomers, on the other hand. It also has turned out to be important to use a particular kind of solvent selected from glycol monoethers and to keep the amount of lower alcohols in the curable composition as low as possible. Moreover, in order to obtain one-component, storage-stable heat curable compositions it is necessary to select the polymerisation catalyst from latent or blocked strong acid catalysts. Those catalysts are inactive at ambient temperature and are activated only when being heated to at least 80° C.

The present invention is therefore drawn to a liquid heat-curable composition comprising:
from 25 to 65% by weight, preferably from 35% to 60% by weight, relative to the total weight of the composition, of a mixture of epoxy-functional monomers, said mixture consisting of
  (a) at least one polyfunctional epoxy monomer selected from monomers comprising from 4 to 8, preferably from 5 to 7, glycidyl groups and/or cycloaliphatic epoxy groups,
  (b) at least one bi- or tri-functional epoxy monomer selected from monomers comprising two or three glycidyl groups and/or cycloaliphatic epoxy groups,
from 25 to 70% by weight, preferably from 55 to 60% by weight, relative to the total weight of the composition of at least one organic solvent selected from glycol monoethers,
from 2.5 to 5% by weight, preferably from 3.0-4.0% by weight, relative to the total weight of epoxy functional monomers (a) and (b), of at least one latent or blocked strong acid catalyst which is inactive at ambient temperature (20° C.) and catalyses epoxy ring-opening only when being heated to a temperature of at least 80° C.,
said heat-curable composition not containing any non-epoxy-functional monomers, in particular not containing any acrylic, methacrylic or silane monomers.

The mixture of epoxy-functional monomers used in the present invention should comprise at least one polyfunctional epoxy monomer. This polyfunctional epoxy monomer is important for a dense and abrasion resistant coating, having a good caustic resistance. Examples 4, 5 and 6 compared to Comparative Examples D, E, and F show that heat curable epoxy compositions containing only bi- and tri-functional epoxy monomers but no hexafunctional epoxy monomer (sorbitol polyglycidyl ether), lead to coatings having poor or only fair caustic resistance, quite low Bayer Abrasion (0.44 to 0.61) and which display unsatisfying worm/blister ratings.

The amount of the at least one polyfunctional epoxy monomer in the epoxy monomer mixture is generally comprised between 5% to 85% by weight.

Said polyfunctionnal epoxy monomers are further preferably selected from polyfunctional glycidyl monomers.

In one embodiment the heat-curable composition contains rather high amounts of polyfunctional monomers, in particular from 76 to 85% by weight, preferably from 79 to 83% by weight, of polyfunctional epoxy monomers (a). The balance to total epoxy content, i.e. from 15% to 24% by weight, preferably form 17% to 21% of the epoxy mixture, being at least one tri-functional epoxy monomer (b) selected from monomers comprising three glycidyl groups. The combination of very interesting performances of coatings obtained by curing of compositions containing such high amounts of polyfunctional epoxy monomers are demonstrated in Examples 1 and 2.

In an alternative embodiment, the heat-curable composition contains relatively low amounts of polyfunctional monomers (a). Such low amounts also lead to good performances with regard to Bayer Abrasion, caustic resistance and worm/blister ratings (see Examples 3-6 of the present invention). The mixture of epoxy-functional monomers preferably comprises from 5 to 20% by weight, more preferably from 8 to 15% by weight, of polyfunctional epoxy monomers (a), the balance being at least one bi- or tri-functional epoxy monomer (b) selected from monomers comprising two or three glycidyl or cycloaliphatic epoxy groups.

The epoxy mixture contains preferably at least one cycloaliphatic epoxy monomer. Such cycloaliphatic epoxy monomers slightly decrease the abrasion resistance of the cured coatings but allow for curing at lower temperature and improved photochromic response when applied as a protective coating onto a photochromic layer. However, the Applicant has observed that caustic resistance gets poor when the concentration of cycloaliphatic epoxy monomers is too high. The epoxy monomer mixture therefore preferably contains less than 80% by weight of cycloaliphatic epoxy monomers.

During the research done on epoxy heat-curable compositions, the Applicants have noted that, surprisingly, the solvent used to prepare the heat-curable composition was critical to obtain coatings with good worm/blister ratings. It has turned out to be important to keep the amount of lower alcohols ($C_{1-4}$ alcohols) as low as possible. As can be seen from Comparative Examples A, B, and C, heat-curable compositions containing a mixture of equal amounts of 1-butanol, methanol and 1-methoxy-2-propanol lead to protective coatings having good caustic resistance and abrasion resistance but poor worm/blister ratings. When, instead, the methanol and 1-butanol were replaced by a glycol monoether, such as 1-methoxy-2-propanol (see Examples 1-6), the worm/blister ratings were quite more satisfactory.

The glycol monoether solvent is preferably selected from alkylene glycol $C_{1-4}$ alkyl monoethers, more preferably from ethylene glycol $C_{1-4}$ alkyl monoethers, propylene glycol $C_{1-4}$ alkyl monoethers, diethylene glycol $C_{1-4}$ alkyl monoethers, triethylene glycol $C_{1-4}$ alkyl monoethers, propylene glycol $C_{1-4}$ alkyl monoethers, dipropylene glycol $C_{1-4}$ alkyl monoethers, triethylene glycol $C_{1-4}$ alkyl monoethers, and tripropylene glycol $C_{1-4}$ alkyl monoethers.

The most preferred glycol monoether is propylene glycol methyl ether (1-methoxy-2-propanol) which is used in all Examples of the present invention.

The presence of low amounts of primary lower alcohols—in addition to the glycol monoether solvent—however is not detrimental to the quality of the resulting coating. As a matter of fact, some additives used in the compositions of the present invention, for example the catalyst or the surfactant, may be provided as a solution in a lower alcohol. It is not necessary to use heat-curable composition completely free of any primary lower alcohol, but the compositions should contain less than 15% by weight, preferably less than 13% by weight and most preferably less than 10% by weight of additional solvents, in particular lower alcohols such as methanol, ethanol, n-propanol, isopropanol or butanol.

The total amount of solvent depends on the epoxy resins used, on the type of ophthalmic lens and on the coating process. The purpose of the solvent is to achieve good surface wetting and a specific coating viscosity range determined by the coating equipment used to achieve a specific coating thickness range. To have good caustic resistance and worm/blister performance, it is necessary to have a coating thickness of not less than 2.90 µm. However, especially on multifocal lenses, the cosmetics of the final lens diminish with increasing coating thickness. The coating thickness therefore should preferably not exceed 6.50 µm. As will be seen in the Examples hereafter, best results have been obtained with coating thicknesses comprised between 4 µm and 5 µm. The skilled person therefore should adjust the total solvent concentration of the claimed compositions and the coating conditions so as to obtain a dry coating thickness comprised in the above ranges.

The heat-curable compositions of the present invention advantageously further contain small amounts, preferably from 0.05 to 0.20% by weight, of at least one surface active compound. The surface active agent is important for good wetting of the substrate resulting in satisfactory cosmetics of the final hard-coating. Said surfactant can include for example poly(alkylene glycol)-modified polydimethylsiloxanes or polyheptamethylsiloxanes, or fluorocarbon-modified polysiloxanes. The heat-curable compositions preferably contain from 0.05% to 0.20%, more preferably from 0.075% to 0.125% of a fluorocarbon-modified polysiloxanes, such as the commercial product EFKA® sold by CIBA.

The polyfunctional epoxy monomer (a) is selected preferably from the group consisting of diglycerol tetraglycidyl ether, dipentaerythritol tetraglycidyl ether, sorbitol polyglycidyl ether, polyglycerol polyglycidyl ether, pentaerythritol polyglycidyl ether such as pentaerythritol tetraglycidyl ether. Among the above polyfunctional epoxy monomers, the Applicant has obtained excellent results with hexafunctional glycidyl monomers, and in particular with sorbitol polyglycidyl ether. Sorbitol polyglycidyl ether (CAS 68412-01-1) of formula

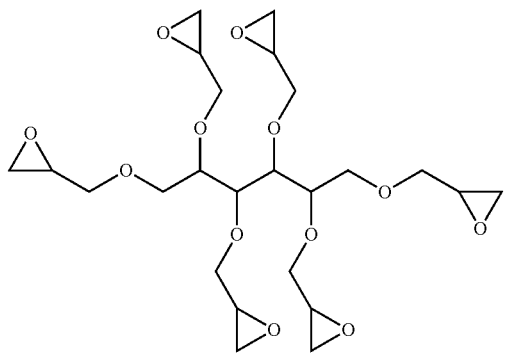 [SMILES: C(OCC(OCC1CO1)C(OCC1CO1)C(OCC1CO1)C(COCC1CO1)OCC1CO1)C1CO1]

can be purchased as Erisys® GE-60 from Emerald Performance Materials.

The bi- or tri-functional epoxy monomer can be selected from the group consisting of trimethylolethane triglycidyl ether, trimethylolmethane triglycidyl ether, trimethylolpropane triglycidyl ether, triphenylolmethane triglycidyl ether, trisphenol triglycidyl ether, tetraphenylol ethane triglycidyl ether, tetraglycidyl ether of tetraphenylol ethane, p-aminophenol triglycidyl ether, 1,2,6-hexanetriol triglycidyl ether, glycerol triglycidyl ether, diglycerol triglycidyl ether, glycerol ethoxylate triglycidyl ether, Castor oil triglycidyl ether, propoxylated glycerine triglycidyl ether, ethylene glycol diglycidyl ether, 1,4-butanediol diglycidyl ether, neopentyl glycol diglycidyl ether, cyclohexanedimethanol diglycidyl ether, dipropylene glycol diglycidyl ether, polypropylene glycol diglycidyl ether, dibromoneopentyl glycol diglycidyl ether, hydrogenated bisphenol A diglycidyl ether, (3,4-Epoxycyclohexane) methyl 3,4-epoxycylohexylcarboxylate and mixtures thereof.

A suitable tri-glycidyl functional monomer is for example trimethylolpropane triglycidylether (CAS 30499-70-8) of formula

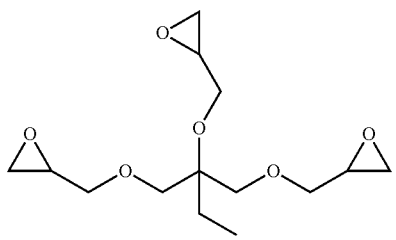 [SMILES: CCC(COCC1CO1)(COCC1CO1)OCC1CO1]

which is sold under the name Erisys® GE 30 by Emerald Performance Materials.

Hydrogenated Diglycidyl Ether of Bisphenol A (hydrogenated DGEBA) of formula

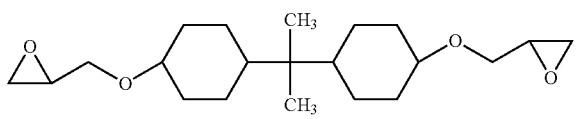

can be purchased as EPALLOY® 5000 from CVC Thermoset Specialties.

The Applicant has also successfully used the product EPALLOY® 5001 (CAS #30583-72-3) a two-component mixture which is described as being an accelerated epoxydized bisphenol A having an average epoxy functionality of 2.4.

(3,4-epoxycyclohexane)methyl 3,4-epoxyhexylcarboxylate of formula

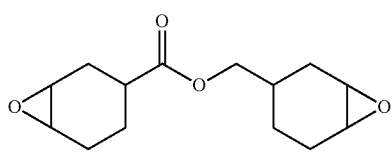 [SMILES: O=C(OCC1CCC2OC2C1)C1CCC2OC2C1]

can be purchased under the denomination of UVACURE® 1500 from Cytec Industries, Inc.

The catalysts found to be able to cure the epoxy composition at temperatures low enough not to damage the underlying substrate or cause adverse affects to the photochromic layer it is designed to protect, are strong acid catalysts designed for ring opening of cyclic ether groups. In order to obtain storage-stable heat-curable composition, the catalyst, of course, should not catalyze the ring-opening at room temperature. Blocked, or latent, catalysts which are activated only upon heating are familiar to the skilled person.

Such blocked strong acid catalysts are based for example on trifluoromethanesulfonic acid (triflic acid), dinonylnaphthalene sulfonic acid (DNNSA), dinonylnaphthalene disulfonic acid (DNNDSA), and ammonium antimony hexafluoride (a Lewis acid) and are available from King Industries for example as Nacure® Super A233 (diethylamine salt of trifluoromethanesulfonic acid), Nacure® 155 (a blocked acid catalyst based on DNNDSA), Nacure® Super XC-7231 (ammonium antimony hexafluoride catalyst), and Nacure® Super-A218 (trifluoromethanesulfonic acid).

The most efficient of these catalysts is Nacure® Super A218.

The present invention is further drawn to a method for forming a protective hard-coating on an ophthalmic lens, in particular on a photochromic layer of an ophthalmic lens, said method comprising the successive steps of (i) coating a heat-curable composition such as defined above onto an ophthalmic lens, said lens preferably comprising a photochromic layer, (ii) heating the ophthalmic lens coated with the heat-curable composition to a temperature of at least 80° C., preferably of 90° C. to 100° C., for at least 5 minutes, so as to form a tack-free coating, (iii) heating the ophthalmic lens with the tack-free coating to a temperature of at least 95° C., preferably of 98 to 105° C., for at least two hours, preferably for 2.5 to 3.5 hours, so as to obtain a completely cured insoluble hard-coating.

Step (i) is preferably carried out by spin coating or dip coating, and more preferably by dip coating. The excellent storage stability and good viscosity performance of the heat curable compositions allow coating of monofocal, bifocal and even of multifocal lenses by simply dipping the photochromic lens into a bath containing the heat-curable composition. The coating thickness can be easily adjusted by modifying the withdrawal speed. As can be seen in Example 2a, 2b and 2c, the longer the withdrawal time, the thinner will be the final dry coating.

The lens with the non-cured layer is then subjected to a first curing step by heating it for at least 5 minutes, preferably for about 10 to 25 minutes, to a temperature of at least 80° C. This temperature of course, depends on the blocked catalyst used. In case the catalyst activation temperature is higher than 80° C., the lens must be heated to a higher temperature.

The obtained tack-free lenses are then subjected to a second curing step at a higher temperature. The heating temperature preferably doesn't exceed 110° C. and is most preferably comprised between 98 and 105° C. The Applicant has shown that increasing the heating temperature above 100° C. is useless since the coating is completely cured at 100° C. (3 hours). Heating to temperatures above 100° C., and especially above 110° C. or even 120° C. could be harmful to the underlying photochromic layer and cause diffusion of the photochromic dyes into the underlying substrate, thereby preventing them from performing their function.

The method of the present invention further may comprise a step consisting of forming a polysiloxane-based abrasion resistant layer onto the cured insoluble clear hardcoating obtained in step (ii). This polysiloxane-based layer can be coated directly on the hard-coating of the present invention, or on an intermediate latex primer coating.

Finally, the present invention is also drawn to ophthalmic lenses comprising a clear, insoluble hard-coating resulting from the heat-curing of a heat-curable composition such as defined above.

Said lens preferably is a photochromic lens, which means it comprises a photochromic layer underlying the hard-coating layer, said photochromic layer preferably being a urethane acrylate based coating, for example a urethane-acrylate based coating prepared by in-mold coating of ophthalmic lenses such as described for example in EP 1963085 and EP 1963070.

The present invention is now described in a more detailed way by of the following Examples which are provided to illustrate the present invention but should not be understood as limiting the scope thereof.

EXAMPLES

Coating Method

Semi-finished straight top (SFST) polycarbonate lenses having a photochromic layer applied to the convex side by post-clamping in the injection molding press were dip-coated with a heat-curable composition Example 1

| | |
|---|---|
| Sorbitol polyglycidyl ether (Erisys GE-60) | 30.63% |
| Trimethylolpropane triglycidyl ether (Erisys GE-30) | 7.07% |
| 1-methoxy-2-propanol (DOWANOL PM, solvent) | 56.55 |
| EFKA 3034 (surfactant) | 0.10 |
| Nacure A-218 (triflic acid 25%, catalyst) | 5.65 |

This composition has a total epoxy content of 37.70% and contains 3.75% of catalyst based on the total epoxy content (5.65×0.25/0.377).

The lenses were dipped one at a time into a 1-liter beaker of said composition at a temperature of about 15° C. using a stainless steel lens hanger to hold the lenses. The lenses were submerged for a period of approximately 10 seconds and then extracted using a hydraulic lift at a rate of 1.83 mm/second.

Heat Curing of the Coating

The coated lenses were then manually flipped such that the convex surface faced upward and were placed in a convection oven on a rack, convex surface up, at a temperature of 90° C. for a period of 15 minutes to cure to a tack-free state. After all lenses were coated and pre-cured to a tack-free state, the lenses were left in the oven and the temperature was increased to 100° C. for a period of three hours. It has been found in subsequent experiments that such a curing was sufficient to completely cure the barrier coating and that a final curing at a temperature of 110° C. or even as high as 120° C. didn't lead to better test results.

Bayer Abrasion

Bayer abrasion resistance is determined by measuring the percent haze of a coated and uncoated lens before and after testing on an oscillating sand abrader as in ASTM F 235-81. The abrader is oscillated for 300 cycles with approximately 500 g of aluminium oxide ($Al_2O_3$) ZF 152412 supplied by Specially Ceramics Grains. The haze is measured using a Pacific Scientific Hazemeter model XL-211, the ratio of the uncoated lens haze (final-initial) is a measure of the performance of the coating with a higher ratio meaning a higher abrasion resistance.

Lenses were tested for Bayer abrasion using the methodology described by the Vision Council which is a modification of ASTM F-735.

Caustic Resistance

Part of the other lenses were used for testing the caustic resistance of the cured hard-coating. They are exposed to two passes through a production coating strip line consisting of Novastrip (sodium hydroxide and sodium carbonate solution)/Citrikleen ECO (mixture of trisodium N-hydroxyethyl ethylene diamine triacetate, triethanolamine alcohol ethoxylate, methanol and d-limonene)/isopropyl alcohol (23° C.), followed by 10% sodium hydroxide solution (60° C.), and 5% sodium hydroxide solution (50° C.).

Worm/Blister Resistance

The worm/blister resistance was tested both on lenses as obtained after heat curing and on lenses coated with an additional overlaying latex primer coating and polysiloxane-based production hard-coating (Mithril hardcoat by Essilor, combination of polyurethane latex followed by polysiloxane hard coating (Altius)).

The worm/blister test is a harsh accelerated test to replicate these defects. The lenses are first subjected to a tumble test in a cylinder containing many types of abrasive and scratch producing materials and the cylinder rotates for about 20 minutes to produce scratches and nicks on the coated lenses. The lenses are then soaked in isopropanol for thirty minutes and examined over a grid for evidence of worms or blisters and are given a score from one to five, one being the best (less than 10% coverage with worms and/or blisters) and five being the worst (more than 50% coverage with worms and/or blisters).

The lenses are examined again one hour later and given a second score. The worms and blisters may indeed fade after one hour and the defect is then not as concerning as if it remains.

Test Results

The above coating and curing steps were carried out in the same way with all compositions of Examples 2-6 and Comparative Examples A-F. The results (Bayer abrasion, caustic resistance, worm/blister ratings) are presented in the below Tables 1 and 2.

TABLE 1

Hard-coatings obtained with compositions based only on glycidyl-functional monomers

| | Example 1 % | Example 2 % | Example 3 % | Comp. Ex. A % | Comp. Ex. B % | Comp. Ex. C % |
|---|---|---|---|---|---|---|
| Component | | | | | | |
| Hydogenated DGBA (Epalloy 5001) | — | — | 33.74 | | | |
| sorbitol polyglycidyl ether (Erisys GE-60) | 30.63 | 23.27 | 6.57 | 23.27 | 30.63 | 29.22 |

TABLE 1-continued

Hard-coatings obtained with compositions based only on glycidyl-functional monomers

| | Example 1 % | Example 2 % | Example 3 % | Comp. Ex. A % | Comp. Ex. B % | Comp. Ex. C % |
|---|---|---|---|---|---|---|
| trimethylolpropane triglycidyl ether (Erisys GE-30) | 7.07 | 5.37 | 12.27 | 5.37 | 7.07 | 6.74 |
| 1-methoxy-2-propanol | 56.55 | 66.96 | 39.44 | 22.32 | 18.85 | 19.45 |
| 1-butanol | — | — | — | 22.32 | 18.85 | 19.45 |
| methyl alcohol | — | — | — | 22.32 | 18.85 | 19.45 |
| EFKA 3034 surfactant | 0.10 | 0.10 | 0.08 | 0.10 | 0.10 | 0.30 |
| Nacure A-218 (25% triflic acid catalyst) | 5.65 | 4.30 | 7.89 | 4.30 | 5.65 | 5.40 |
| Total epoxy | 37.70 | 28.64 | 52.58 | 28.64 | 37.70 | 35.96 |
| % Catalyst (based on total mass of epoxy) | 3.75 | 3.75 | 3.75 | 3.75 | 3.75 | 3.75 |
| Test Results: | | | | | | |
| Cosmetic issues | acceptable drip and line | acceptable drip and line | not evaluated | good line | borderline acceptable drip and line | Small drip and build up at line |
| % solids | 39.8% | 30.8% | 54.6% | 30.8% | 39.8% | 36.0% |
| caustic resistance | very good | very good | very good | very good | very good | very good |
| Bayer Abrasion | 2.44 | 2.88 | 0.70 | 1.5 | 1.90 | 2.38 |
| coating thickness (microns) | 4.79 μm | 2.90 μm | 4.00 μm | 1.50 μm | 5.60 μm | 4.27 μm |
| adhesion to photochromic layer | very good | very good | very good | very good | very good | very good |
| worm/blister rating without polysiloxane hard-coat** (hard-coat control = 4/2) | 1/1 | 4/3 | Not tested | 1/1 | 5/5 | 4/4 |
| worm/blister rating with polysiloxane hard-coat** (Control* = 5/5) | 5/2 | 5/2 | Not tested | 5/5 | 4/3 | 5/5 |

*urethane-acrylate based photochromic layer prepared by in-mold coating of the ophthalmic lens with polysiloxane hard-coat
**the first result is obtained at t = 0, the second result is obtained by inspection after one hour The catalyst concentration (Nacure® A-218) was 15 weight % based on the total mass of epoxy used and was constant for all examples. As Nacure® A-218 is a 25% solution of triflic acid in 1-butanol, the total amount of solid catalyst is 3.75% based on the total mass of epoxy.

As can be seen from the above table, the type of solvent used can drastically affect the worm/blister rating of the optical article. In Comparative Examples A, B, and C where a mixture of equal amounts of 1-methoxy-2-butanol, 1-butanol and methanol were used as a solvent, the worm/blister ratings are unsatisfactory, except for the worm/blister rating of Comparative Example A without additional polysiloxane hard-coating. This apparently good performance (worm/blister rating=1) is due to the fact that the protective layer is so thin (1.50 μm) that it is permeable to the solvent and allows at least part of it to escape through the protective layer and evaporate. Performance is poor with a polysiloxane hard-coating, as expected, because the solvent permeating the thin protective layer cannot get further and will swell any nicks and scratches, thereby forming "blisters" and "worms".

TABLE 2

Hard-coatings obtained with compositions based on glycidylfunctional and cycloaliphatic epoxy monomers

| | Ex. 4 % | Ex. 5 % | Ex. 6 % | Comp. Ex. D % | Comp. Ex. E % | Comp. Ex. F % |
|---|---|---|---|---|---|---|
| Component | | | | | | |
| Cycloaliphatic epoxy (UVACURE 1500) | 11.96 | 37.39 | 34.44 | 37.00 | 43.20 | 45.67 |
| Hydrogenated DGEBA (Epalloy 5001) | 12.93 | — | — | — | 10.80 | 5.71 |
| sorbitol polyglycidyl ether (Erisys GE-60) | 4.85 | 7.27 | 5.74 | — | — | — |
| trimethylolpropane triglycidyl ether (Erisys GE-30) | 9.05 | 13.6 | 22.96 | 12.33 | — | — |
| 1-methoxy-2-propanol | 55.31 | 34.0 | 28.70 | 43.16 | 37.80 | 39.96 |
| 1-butanol | — | — | — | — | — | — |

TABLE 2-continued

Hard-coatings obtained with compositions based on glycidylfunctional and cycloaliphatic epoxy monomers

|  | Ex. 4 % | Ex. 5 % | Ex. 6 % | Comp. Ex. D % | Comp. Ex. E % | Comp. Ex. F % |
|---|---|---|---|---|---|---|
| methyl alcohol | — | — | — | — | — | — |
| EFKA 3034 surfactant | 0.10 | 0.14 | 0.11 | 0.11 | 0.10 | 0.10 |
| Nacure A-218 (25% triflic acid catalyst) | 5.82 | 7.61 | 8.04 | 7.40 | 8.10 | 8.56 |
| Total epoxy | 38.79 | 58.26 | 63.14 | 49.33 | 54.00 | 51.38 |
| % Catalyst (based on total mass of epoxy) | 3.75 | 3.27 | 3.18 | 3.75 | 3.75 | 4.17 |
| % solids | 40.30 | 60.23 | 65.21% | 51.24 | 56.08 | 53.57 |
| Test Results: |  |  |  |  |  |  |
| Caustic Resistance | excellent | excellent | excellent | good | fair | poor |
| Bayer Abrasion | 1.20 | 1.36 | 1.52 | 0.61 | 0.53 | 0.44 |
| coating thickness (microns) | 5.2 μm | 4.95 μm | 6.37 μm | 5.28 μm | 5.18 μm | 5.17 μm |
| worm/blister rating without hard-coat** (hard-coat control = 4/2) | 1/1 | Not tested | Not tested | 2/2 | 5/5 | 5/5 |
| worm/blister rating with polysiloxane hard-coat (Control* = 5/5) | 4/2 | Not tested | Not tested | 5/5 | 5/3 | Not tested |

*urethane-acrylate based photochromic layer prepared by in-mold coating of the ophthalmic lens with polysiloxane hard-coating
**the first result is obtained at t = 0, the second result is obtained by inspection after one hour In below Table 3, Example 2 is applied at three different coating thicknesses (Example 2(a), (b), and (c)) by varying the lens withdrawing time in a dip coating method. The slower the lens is withdrawn, the thinner will be the coating.

TABLE 3

Coating thickness as a function of withdrawing speed

|  | Example 2 (a) | Example 2 (b) | Example 2(c) |
|---|---|---|---|
| Lens withdrawing time | 15 seconds | 30 seconds | 60 seconds |
| Coating thickness | 6.93 microns | 4.70 microns | 2.90 microns |
| Worm/blister rating without polysiloxane hard-coating** | 1/1 | 1/1 | 4/3 |
| Worm/blister rating with polysiloxane hard-coating** | 5/2 | 5/2 | 5/3 |
| Bayer abrasion | 2.41 | 2.88 | 1.74 |

**the first result is obtained at t = 0, the second result is obtained by inspection after one hour As can be seen, the worm/blister performances decrease with decreasing coating thickness. The best ratings are obtained for the epoxy-coating having a thickness of between 4 and 5 μm.

The invention claimed is:

1. Heat-curable composition comprising,
   from 25 to 65% by weight, relative to the total weight of the composition, of a mixture of epoxy-functional monomers, said mixture consisting of
   (a) at least one polyfunctional epoxy monomer selected from monomers comprising from 4 to 8, glycidyl groups and/or cycloaliphatic epoxy groups, which represent from 76 to 85% by weight of total epoxy content,
   (b) at least one tri-functional epoxy monomer selected from monomers comprising three glycidyl groups, which represent the balance of total epoxy content,
   from 25 to 70% by weight, relative to the total weight of the composition of at least one organic solvent selected from glycol monoethers,
   from 2.5 to 5% by weight, relative to the total weight of epoxy functional monomers (a) and (b), of at least one strong acid catalyst which is inactive at ambient temperature (20° C.) and catalyzes epoxy ring-opening only when being heated to a temperature of at least 80° C.,
said heat-curable composition not containing any acrylic, methacrylic or silane monomers.

2. Heat-curable composition according to claim 1, further comprising from 0.05 to 0.20% by weight of at least one surface agent, said surface agent preferably being selected from fluorocarbon-modified polysiloxanes.

3. Heat-curable composition according to claim 1, wherein the glycol monoether solvent is selected from alkylene glycol $C_{1-4}$ alkyl monoethers.

4. Heat-curable composition according to claim 3, wherein the glycol monoether is propylene glycol methyl ether (1-methoxy-2-propanol).

5. Heat-curable composition according to claim 1, containing less than 15% by weight, of additional solvents.

6. Heat-curable composition according to claim 1, wherein the polyfunctional epoxy monomer (a) is selected from the group consisting of diglycerol tetraglycidyl ether, dipentaerythritol tetraglycidyl ether, sorbitol polyglycidyl ether, polyglycerol polyglycidyl ether, pentaerythritol polyglycidyl ether such as pentaerythritol tetraglycidyl ether.

7. Heat-curable composition according to claim 1, wherein the polyfunctional epoxy monomer is a hexafunctional glycidyl monomer.

8. Heat-curable composition according to claim 7, wherein the polyfunctional epoxy monomer (a) is sorbitol polyglycidyl ether.

9. Heat-curable composition according to claim 1, wherein the bi- or tri-functional epoxy monomer is selected from the group consisting of trimethylolethane triglycidyl ether, trimethylolmethane triglycidyl ether, trimethylolpropane triglycidyl ether, triphenylolmethane triglycidyl ether, trisphenol triglycidyl ether, tetraphenylol ethane triglycidyl ether, p-aminophenol triglycidyl ether, 1,2,6-hexanetriol triglycidyl ether, glycerol triglycidyl ether, diglycerol triglycidyl ether, glycerol ethoxylate triglycidyl ether, Castor oil triglycidyl ether, propoxylated glycerine triglycidyl ether, and mixtures thereof.

* * * * *